US011222210B2

(12) United States Patent
Sharma et al.

(10) Patent No.: US 11,222,210 B2
(45) Date of Patent: Jan. 11, 2022

(54) ATTENTION AND WARPING BASED DOMAIN ADAPTATION FOR VIDEOS

(71) Applicant: NEC Laboratories America, Inc., Princeton, NJ (US)

(72) Inventors: Gaurav Sharma, Newark, CA (US); Manmohan Chandraker, Santa Clara, CA (US)

(73) Assignee: NEC Corporation

( * ) Notice: Subject to any disclaimer, the term of this patent is extended or adjusted under 35 U.S.C. 154(b) by 247 days.

(21) Appl. No.: 16/673,156

(22) Filed: Nov. 4, 2019

(65) Prior Publication Data
US 2020/0151457 A1    May 14, 2020

Related U.S. Application Data

(60) Provisional application No. 62/760,395, filed on Nov. 13, 2018.

(51) Int. Cl.
*G06K 9/00* (2006.01)
*G06K 9/62* (2006.01)
*G06N 3/08* (2006.01)

(52) U.S. Cl.
CPC ....... *G06K 9/00744* (2013.01); *G06K 9/6201* (2013.01); *G06K 9/6256* (2013.01); *G06K 9/6269* (2013.01); *G06N 3/08* (2013.01)

(58) Field of Classification Search
CPC ............ G06K 9/00744; G06K 9/6256; G06K 9/6201; G06K 9/6269; G06K 9/6267; G06K 9/342; G06K 9/6271; G06K 9/4628; G06K 9/6232; G06K 9/6259; G06K 9/00771; G06K 9/6215; G06K 9/6228;
(Continued)

(56) References Cited

U.S. PATENT DOCUMENTS

2017/0140253 A1\* 5/2017 Wshah ..................... G06N 3/08
2018/0174046 A1\* 6/2018 Xiao ................. G06K 9/00362
(Continued)

OTHER PUBLICATIONS

"Synthesizing Training Images for Boosting Human 3D Pose Estimation"; Wenzheng Chen, 2016 Fourth International Conference on 3D Vision (3DV) (pp. 479-488) (Year: 2016).\*
(Continued)

*Primary Examiner* — Michael S Osinski
(74) *Attorney, Agent, or Firm* — Joseph Kolodka

(57) ABSTRACT

A computer-implemented method is provided for domain adaptation between a source domain and a target domain. The method includes applying, by a hardware processor, an attention network to features extracted from images included in the source and target domains to provide attended features relating to a given task to be domain adapted between the source and target domains. The method further includes applying, by the hardware processor, a deformation network to at least some of the attended features to align the attended features between the source and target domains using warping to provide attended and warped features. The method also includes training, by the hardware processor, a target domain classifier using the images from the source domain. The method additionally includes classifying, by the hardware processor using the trained target domain classifier, at least one image from the target domain.

20 Claims, 4 Drawing Sheets

(58) Field of Classification Search
CPC ........ G06K 9/6268; G06K 9/629; G06N 3/08;
G06N 3/0454; G06N 3/084; G06N 3/088;
G06N 3/0472; G06N 3/04; G06N 3/02;
G06N 3/0445; G06N 3/0481; G06N
3/063; G06N 3/082; G06T
2207/20081–20084; G06T 2207/10081;
G06T 2207/10088
See application file for complete search history.

(56) References Cited

U.S. PATENT DOCUMENTS

| | | | | |
|---|---|---|---|---|
| 2018/0235577 | A1* | 8/2018 | Buerger | A61B 8/5246 |
| 2018/0330205 | A1* | 11/2018 | Wu | G06K 9/6288 |
| 2019/0114462 | A1* | 4/2019 | Jang | G06K 9/3233 |
| 2019/0180136 | A1* | 6/2019 | Bousmalis | G06T 7/74 |
| 2019/0220977 | A1* | 7/2019 | Zhou | G06T 5/50 |
| 2019/0244107 | A1* | 8/2019 | Murez | G06N 20/00 |
| 2019/0304065 | A1* | 10/2019 | Bousmalis | G06N 3/08 |
| 2019/0354801 | A1* | 11/2019 | Sohn | G06K 9/00288 |
| 2020/0042877 | A1* | 2/2020 | Whatmough | G06N 3/063 |
| 2020/0074289 | A1* | 3/2020 | Yu | G06N 3/063 |
| 2020/0134444 | A1* | 4/2020 | Chen | G06N 3/084 |
| 2020/0184256 | A1* | 6/2020 | Ye | G06K 9/6223 |
| 2020/0193269 | A1* | 6/2020 | Park | G06K 9/6271 |
| 2020/0272897 | A1* | 8/2020 | Ishii | G06N 20/00 |
| 2020/0342643 | A1* | 10/2020 | Gouws | G06N 3/04 |
| 2021/0012198 | A1* | 1/2021 | Zhang | G06K 9/6256 |
| 2021/0012486 | A1* | 1/2021 | Huang | G06T 7/0012 |
| 2021/0043306 | A1* | 2/2021 | Cheng | G06N 3/08 |
| 2021/0056693 | A1* | 2/2021 | Cheng | G06N 3/0454 |
| 2021/0232926 | A1* | 7/2021 | Hutter | G06K 9/6268 |

OTHER PUBLICATIONS

"Adaptive Deep Learning Through Visual Domain Localization"; Gabriele Angeletti, 2018 IEEE International Conference on Robotics and Automation (ICRA) (pp. 7135-7142) (Year: 2018).*

"Diversified Dual Domain-Adversarial Neural Networks"; Yuchun Fang, 2018 24th International Conference on Pattern Recognition (ICPR) (pp. 615-620) (Year: 2018).*

Carreira et al., "Quo Vadis, Action Recognition? A New Model and the Kinetics Dataset", arXiv:1705.07750v3 [cs.CV] Feb. 12, 2018, p. 1-10.

Dai et al., "Deformable Convolutional Networks", arXiv:1703.06211v3 [cs.CV] Jun. 5, 2017, pp. 1-12.

Ganin et al., "Unsupervised Domain Adaptation by Backpropagation", Proceedings of the 32 nd International Conference on Machine Learning, Jul. 2015, 10 pages.

* cited by examiner

ATTENTION AND WARPING BASED DOMAIN ADAPTATION FOR VIDEOS

RELATED APPLICATION INFORMATION

This application claims priority to U.S. Provisional Patent Application Ser. No. 62/760,395, filed on Nov. 13, 2018, incorporated herein by reference herein its entirety.

BACKGROUND

Technical Field

The present invention relates to information processing and more particularly to attention and warping based domain adaptation for videos.

Description of the Related Art

While a significant amount of annotated video data is available for third person perspective, it is relatively scarce for a first person perspective. As such, there is a need for an approach for classifying first person videos by domain adaptation to third person videos.

SUMMARY

According to an aspect of the present invention, a computer-implemented method is provided for domain adaptation between a source domain and a target domain. The method includes applying, by a hardware processor, an attention network to features extracted from images included in the source and target domains to provide attended features relating to a given task to be domain adapted between the source and target domains. The method further includes applying, by the hardware processor, a deformation network to at least some of the attended features to align the attended features between the source and target domains using warping to provide attended and warped features. The method also includes training, by the hardware processor, a target domain classifier using the images from the source domain. The method additionally includes classifying, by the hardware processor using the trained target domain classifier, at least one image from the target domain.

According to another aspect of the present invention, a computer program product is provided for domain adaptation between a source domain and a target domain. The computer program product includes a non-transitory computer readable storage medium having program instructions embodied therewith. The program instructions are executable by a computer to cause the computer to perform a method. The method includes applying, by a hardware processor, an attention network to features extracted from images included in the source and target domains to provide attended features relating to a given task to be domain adapted between the source and target domains. The method further includes applying, by the hardware processor, a deformation network to at least some of the attended features to align the attended features between the source and target domains using warping to provide attended and warped features. The method also includes training, by the hardware processor, a target domain classifier using the images from the source domain. The method additionally includes classifying, by the hardware processor using the trained target domain classifier, at least one image from the target domain.

According to yet another aspect of the present invention, a computer processing system is provided for domain adaptation between a source domain and a target domain. The computer processing system includes a memory device including program code stored thereon. The computer processing system further includes a hardware processor, operatively coupled to the memory device, and configured to run the program code stored on the memory device to apply an attention network to features extracted from images included in the source and target domains to provide attended features relating to a given task to be domain adapted between the source and target domains. The hardware processor further runs the program code to apply a deformation network to at least some of the attended features to align the attended features between the source and target domains using warping to provide attended and warped features. The hardware processor also runs the program code to train a target domain classifier using the images from the source domain. The processor additionally runs the program code to classify, using the trained target domain classifier, at least one image from the target domain.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to attention and warping based domain adaptation for videos.

One or more embodiments of the present invention provide a domain adaptation method for human action recognition in videos, which can take annotated videos of a source domain, e.g. third person videos, along with unannotated videos of a target domain, e.g. videos from first person cameras, and can learn a classifier for classifying the target domain videos. This is a generally applicable scenario, when large amounts of source videos have annotation but the amount of annotations available on the target domain videos is much less (and is expensive to collect). The idea is to leverage the annotation on the source domain to learn a better classifier for the target domain.

In an embodiment, the proposed domain adaptation method learns to attend to relevant discriminative regions in the source domain videos as well as videos from challenging platforms (e.g., taken from drones). Given the attention regions in the source and target videos, the method then learns warping using deformable convolutions to align the target video to the source video. This alignment is learned by minimizing a loss which is a combination of two components: (i) domain adversarial loss which ensures alignment of the two domains at either the video level or at an intermediate feature level, and (ii) classification or verification loss which forces correct classification for the source domain examples. Once learned, the classifier can then predict the regions to attend to for a new test video from the target domain, and then warp the regions to make the features closer to the source domain so that the source classifier can be used to make the prediction.

Figure 1:
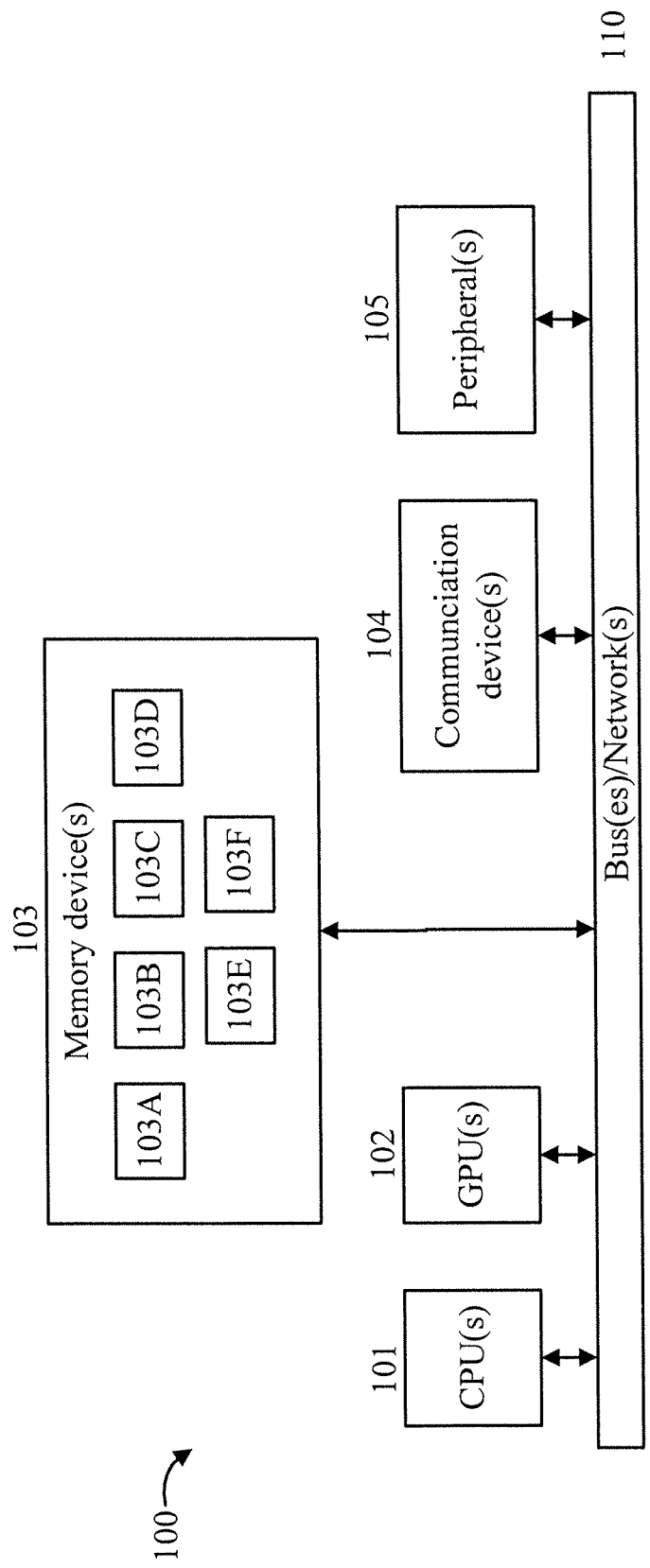
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

In an embodiment, the memory devices 103 can store code for implementing one or more of the following: a feature extractor 103A; an attention network 103B; a deformation network 103C; a global pooler 103D; a domain adversarial classifier 103E, and a classifier 103F with classification loss. These and other elements described herein can be implemented at least in part by memory devices 103.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As used herein, the term "hardware processor subsystem" or "hardware processor" in short refers to a processor, memory, and software combination that cooperate to perform one or more specific tasks. In an embodiment, the hardware processor subsystem can include one or more data processing elements (e.g., logic circuits, etc.). In an embodiment, the one or more data processing elements can be included in a central processing unit, a graphics processing unit, and/or a separate processor or computing element-based (e.g., logic gates, etc.) controller. In an embodiment, the hardware processor subsystem can include one or more on-board memories (e.g., caches). In an embodiment, the hardware processor subsystem can include one or more other memories (e.g., ROM, RAM, BIOS). In an embodiment, the hardware processor subsystem can include and execute one or more software applications. In an embodiment, the one or more software applications can include the operating system and/or one or more other applications and/or specific code to achieve a specified result. These and other variations of a hardware processor subsystem are readily determined given the teachings of the present invention provided herein.

Figure 2:
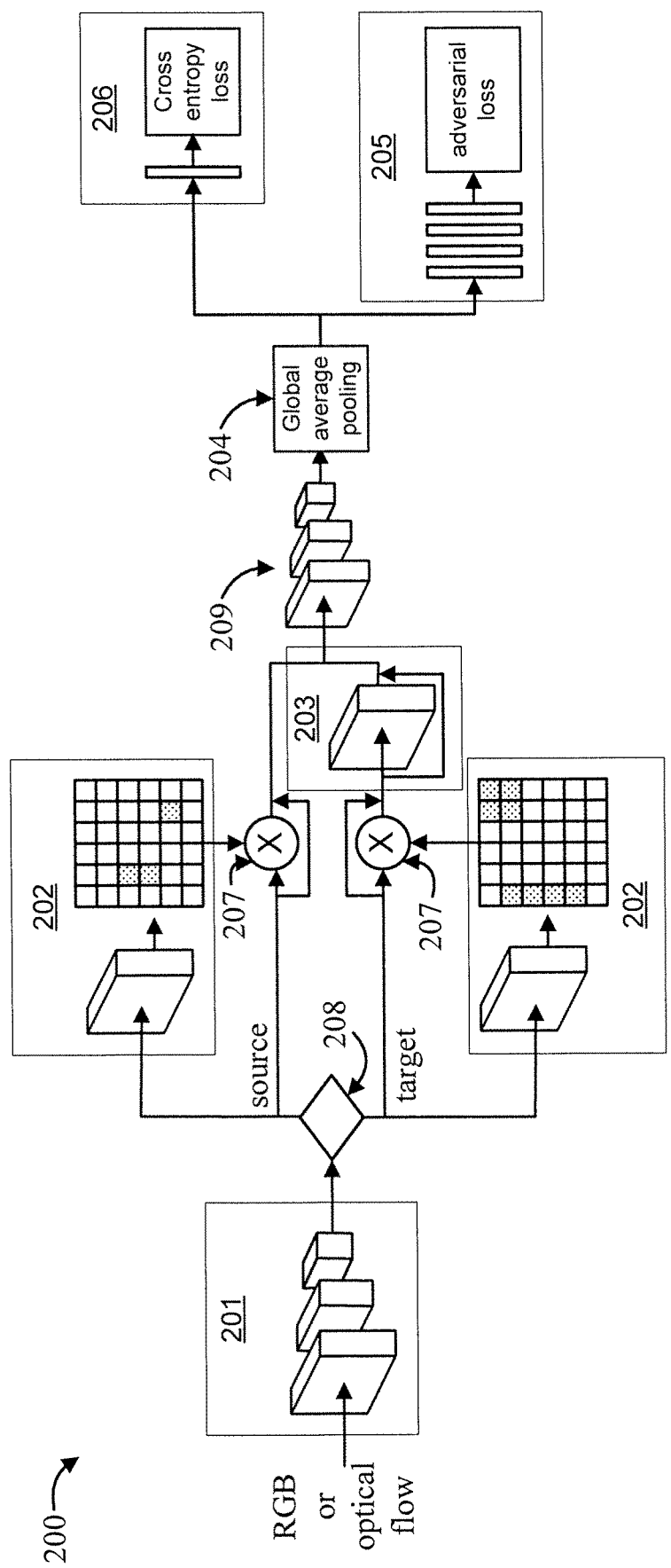
FIG. 2 is a block diagram showing an exemplary apparatus for attention and warping based adaptation for videos, in accordance with an embodiment of the present invention.

FIG. 2 is a block diagram showing an exemplary apparatus 200 for attention and warping based adaptation for videos, in accordance with an embodiment of the present invention.

The apparatus 200 includes a feature extractor 201, an attention network 202, a deformation network 203, global average pooling portion 204, a domain adversarial classifier and loss portion 205, and a classifier 206 trained with a classification loss. The apparatus further includes combiners 207, a demultiplexor 208, and additional common CNN layers 209.

The feature extractor 201 is a convolutional neural network (CNN) which takes RGB or optical flow frames (one or multiple frames concatenated) of the input video and gives out the corresponding features. The feature extractor 201 can be any image or video based CNN.

The attention network 202 can be applied to either or both the source and the target domain. The purpose of the attention network 202 is to highlight (by giving high relative weights to) regions of the video frame which include more information for the task, e.g., for human actions like "picking up an object" the attention network 202 may highlight the actor's hand and the object with which the actor's hand is interacting.

The deformation network (or "deform-net" in short) 203 is a small CNN with a deformable convolution layer and possibly more, convolutional or other types of layers. The deformation network 203 can be applied to either or both the source and target domain (noting that it is only shown on target domain in FIG. 2 for the sake of illustration). The purpose of the deformation network 203 is to take the attended feature and warp it spatially so that the features from both domains are better aligned with each other. This would enable usage of the source classifier for classifying the target domain videos as well.

The additional common CNN layers 209 further use the aligned features and transforms them so that they are better suited for the goals of (i) classification (via loss 206) and (ii) confusing the domain discriminator (via loss 205). While the main intended purpose of the deformation network is to spatially align the features, the main intended purpose of the additional layers 209 is to further bring the spatially aligned features from source and target domains closer in the feature space so that the source classifier can be successfully used for the target videos as well. These additional layers can be zero or any number, as required by the application, of convolution of any other types of CNN layers.

The domain adversarial classifier and loss portion 205 tries to predict which video/frame features come from the source domain and which come from the target domain. The learning is based on maximizing this loss by the feature module (the output after 204) and minimizing this loss by the domain adversarial module 205. The network layers from the beginning to module 204, are trained to maximize this loss, which encourages that the features which are obtained after the global pooling module 204 are such that they are hard to distinguish in terms of their domain (source or target). While the network layers in block 205 are trained to minimize the same loss, to force the features to be domain invariant. This is a min max game where the feature network (blocks 200 to 204) tries to make the features as domain independent as possible, while the domain discriminator 205 tries to use the features to predict the domain. This results in features which are hard to distinguish in terms of their originating domain and hence are aligned with each other (in terms of domain). This would make it possible to use the features for the target domain with the source domain classifier as they would then be aligned. This can be put on any feature layer after the attention and deform-net feature.

The classifier 206 trained with a classification loss (e.g., cross entropy loss) ensures that the source features are learned in a way which is discriminative with respect to the source classification task. FIG. 2 shows only the cross entropy classification loss; the classification loss is used when the source and target labels are the same, while the verification loss is used when they are different. In the former case, once the system is learnt, the source classifier can be directly used for the target examples. In the latter case, the feature embedding can be used for the target domain to do nearest neighbor based classification.

Figure 3:
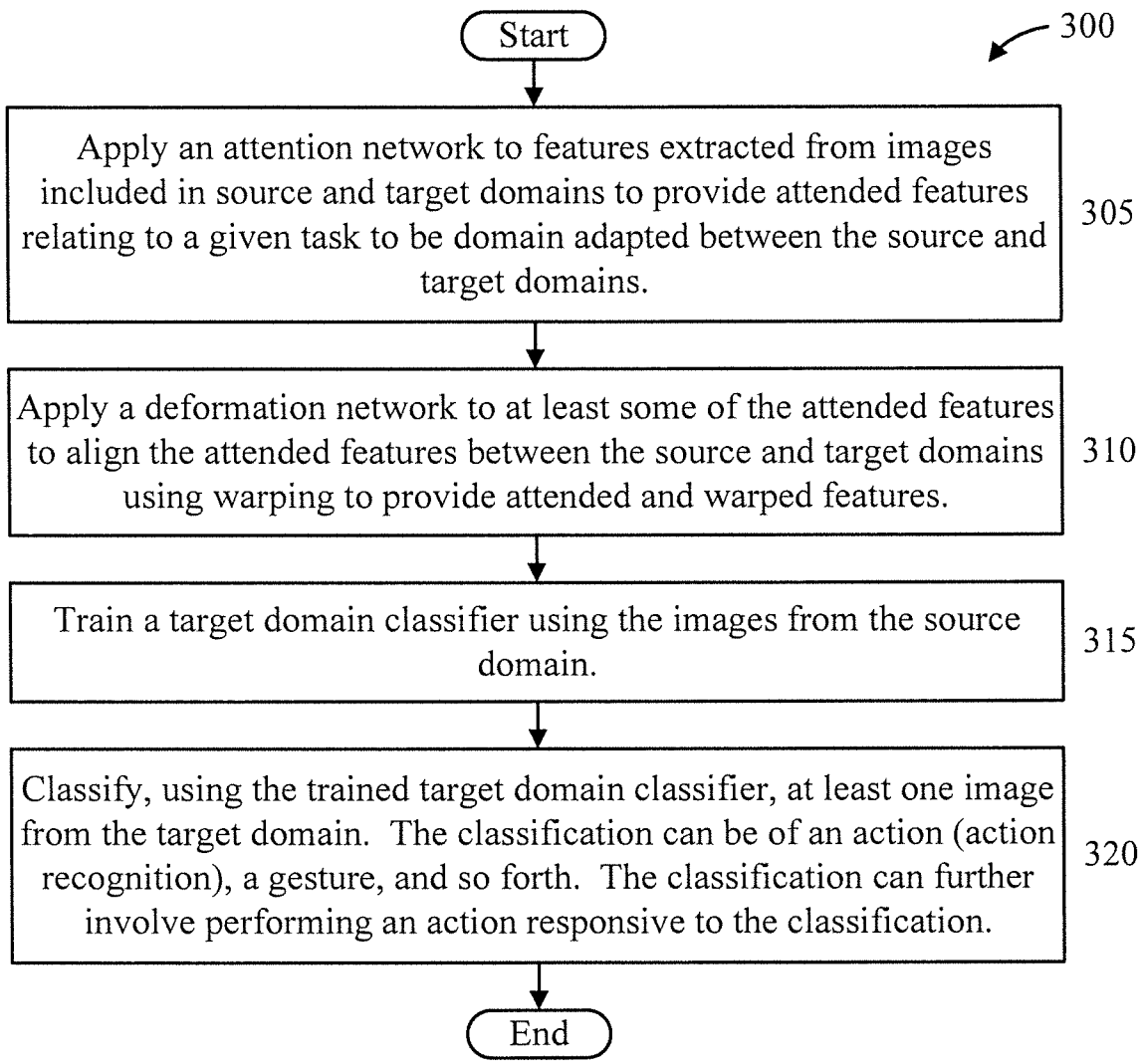
FIG. 3 is a flow diagram showing an exemplary method for domain adaptation, in accordance with an embodiment of the present invention.

FIG. 3 is a flow diagram showing an exemplary method for domain adaptation 300, in accordance with an embodiment of the present invention.

At block 305, apply an attention network to features extracted from images included in source and target domains to provide attended features relating to a given task to be domain adapted between the source and target domains.

At block 310, apply a deformation network to at least some of the attended features to align the attended features between the source and target domains using warping to provide attended and warped features.

At block 315, train a target domain classifier using the images from the source domain.

At block 320, classify, using the trained target domain classifier, at least one image from the target domain. The classification can be of an action (action recognition), a gesture, and so forth. The classification can further involve performing an action responsive to the classification. For example, a wave up can mean "turn on" appliance on and wave down can mean "turn off" an appliance, and responsive to the classification, one of those actions can be automatically performed.

Figure 4:
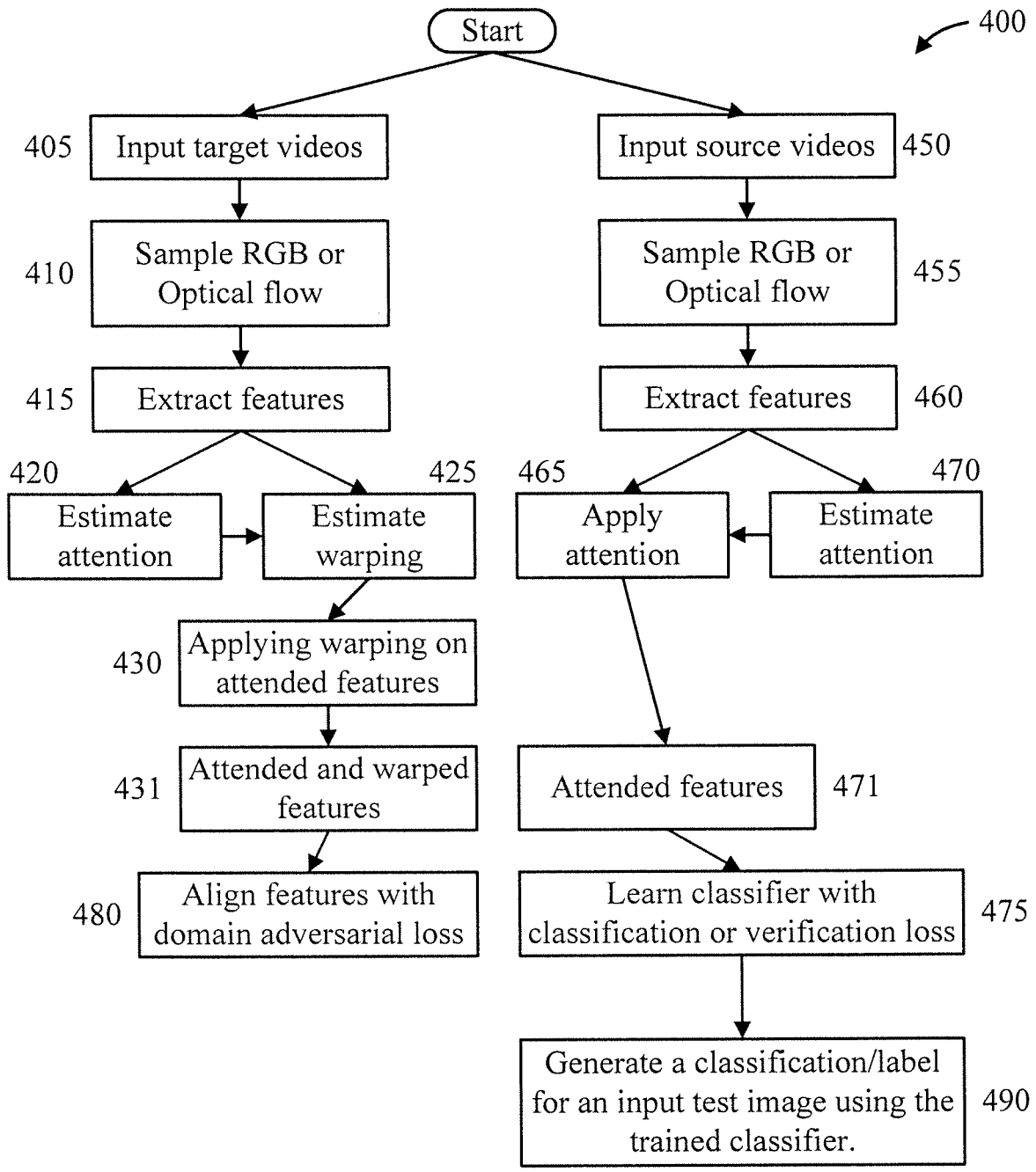
FIG. 4 is a high-level flow diagram showing an exemplary method for domain adaptation, in accordance with an embodiment of the present invention.

FIG. 4 is a high-level flow diagram showing an exemplary method 400 for domain adaptation, in accordance with an embodiment of the present invention.

The training method 400 includes a target video flow path on the left and a source video flow path on the right. Blocks 405 through 480 corresponding to a training stage of method 400, while block 490 corresponds to an inference stage of method 400.

At block 405, input target videos.

At block 410, sample the target videos to obtain RGB or optical flow frames.

At block 415, extract features from the RGB or optical flow frames.

At block 420, estimate attention.

At block 425, estimate a warping from the estimated attention and the extracted features.

At block 430, apply the warping on the attended features to obtain attended and warped features 431.

At block 450, input source videos.

At block 455, sample the source videos to obtain RGB or optical flow frames.

At block 460, extract features from the RGB or optical flow frames.

At block 465, estimate attention.

At block 470, apply the estimated attention to the extracted features to obtain attended features 471.

At block 475, learn a classifier with a classification or verification loss.

At block 480, align the attended and warped features obtained by block 430 with the attended features obtained by block 470.

At block 490, generate a classification/label for an input test image using the trained classifier. In an embodiment, the prediction is for an action classification. In this way, actions taken by objects (e.g., motor vehicles, people, pets, etc.) can be classified. In an embodiment, block 490 can further include performing an action responsive to the prediction. For example, in the case of a classification being of an imminent crash situation, block 490 can further involve applying the brakes or steering out of the way of an obstacle, and so forth. For an action, as an example, a user's movement can be characterized relative to a virtual gaming environment. As a further example, the classification of an undesirable action such as dropping an object (e.g., by a robot or person in an assembly line), can be countered by a remedial action such as picking up the object and putting it back it in proper place, e.g., in the assembly line (e.g., by the same or another robot, etc.) or dispatching a robotic cleaner to clean a spill, and/or so forth.

A further description will now be given regarding various aspects of the present invention, in accordance with one or more embodiments of the present invention.

In the following description, the following notations are used:

$x \in \mathbb{R}^{h \times w \times c}$ denotes a c-channel h×w image (in general, a feature map);

$f: I \to Y$, $I \subset \mathbb{R}^{h \times w \times c}$ denotes a CNN which transforms the image input to the desired output (e.g. distribution over class labels);

$f_\ell : I \to \mathbb{R}^{h_\ell \times w_\ell \times c_\ell}$ denotes the CNN $f(\cdot)$ truncated to layer $\ell$, which takes an input image and outputs a feature map of appropriate size as per the network architecture, and $\hat{f}_\ell : \mathbb{R}^{h_\ell \times w_\ell \times c_\ell} \to Y$ as the remaining part, i.e., $\hat{f}_\ell \circ f_\ell = f \forall \ell$;

superscripts s and t denote the source and target domains, respectively;

$f^s(\cdot)$ and $f^t(\cdot)$ denote two CNNs operating on the source and target domains, respectively, e.g., third person and first person videos, respectively in the described example.

A description will now be given regarding an exemplary setting to which the present invention can be applied, in accordance with an embodiment of the present invention.

One or more embodiments of the present invention can be implemented in an unsupervised domain adaptation setting, where we have annotated training data for the source domain, i.e. $(x_s, y_s) \sim (X_s, Y_s)$, and only unannotated target domain data, $x_t \sim X_t$. The aim is to train a classifier C(x) to classify the examples into K classes in a domain invariant way, i.e., trained using annotated source domain videos but usable for target videos as well.

A description will now be given regarding various aspects of the present invention.

Abstract "information" in the source and target videos is decomposed as $\chi(x^i)=\chi^*(x^i) \oplus \chi^+(x^i) \forall i \in \{s, t\}$, where $\chi^*(\bullet)$ is the information pertinent to the current task and $\chi^+$ is the additional information, with $\oplus$ being an aggregation operator in the output space of $\chi$'s. Utilizing the current domain adaptation methods would be equivalent to aligning the distributions of $\chi(x^s)$ and $\chi(x^t)$. Here, we align only $\chi^*(x^i)$ i.e., the information pertinent to the task. As a concrete case of third and first person videos, if the classes are human actions, then we should aim to focus on regions (for both training and inference) that include the human regions and the associated objects (if any) which are contributing to the action, while ignoring the background.

A method will now be described that jointly (i) extracts the pertinent information extraction function $\chi^*$, and (ii) aligns the distributions of $\chi^*(x^s)$ and $\chi^*(x^t)$.

A description will now be given regarding domain adaptation via attention modulated and warped feature alignment, in accordance with one or more embodiments of the present invention.

It is hypothesized that the information pertinent for the current task, e.g., human action recognition, can be extracted using spatiotemporal attention. It is proposed to use attention to filter out information which is discriminative for the task of human action recognition with the aim of aligning it across source and target domains. However, while we have supervision, albeit not for attention but for the task, in the source domain we might not have the same in the target domain. In such a case we need to define a mechanism for predicting attention in an unsupervised way.

The source network is trained with attention, as we expect the action to be localized on one or more of the following: (i) the human actor(s); and (ii) the nearby context, and the object(s) of interest (if any). For any video, we define attention as a 2D spatial array or weights which modifies the input feature map by taking the Hadamard (i.e., element-wise) product with the two dimensional output of every channel. $\phi: \mathbb{R} h_\ell \times w_\ell \times c_\ell \rightarrow \mathbb{R} h_\ell \times w_\ell \times c_\ell$ denotes the attention computing function, which modulates the features $z \in \mathbb{R} h_\ell \times w_\ell \times c_\ell$ as follows:

$$\phi(z)_{::k} = \alpha \odot z_{::k} \forall k \in \{1, \ldots, c_\ell\} \quad (1)$$

where the subscript :: k denotes the k-th channel of the respective feature map, $\odot$ is the Hadamard product for matrices, and $\alpha \in \mathbb{R} h_\ell \times w_\ell$ is the attention weight map. Such an attention layer can be inserted in the network at any inter-mediate layer f, to obtain the pertinent information as follows:

$$x^*(x) = \widehat{f_\ell} \circ \phi \circ f_\ell(x), \text{ for some } \ell. \quad (2)$$

In addition to the attention based discriminative information extraction, it is also desired to correct the different spatial 'deformations' in a first person video, e.g., due to the radial distortion, and due to camera shake. To do so, we use a deformable convolution layer.

We use a deformable convolution layer, i.e., rather than sampling from the regular grid on the current feature map, we sample from an irregular grid. This is implemented as bilinear filtering as follows:

$$x(p) = \Sigma_q G(p,q) \cdot x(q), \quad (3)$$

where $$G(p,q) = g(q_x, p_x) \cdot g(q_y, p_y), \quad (4)$$

with $$g(a,b) = \max(0, 1-|a-b|). \quad (5)$$

Here p is an arbitrary location on the grid and q indexes over all the integral grid positions. The convolutions are then performed as follows:

$$z(p_0) = \Sigma_{p_n \in N} w(p_n) \cdot x(p_0 + p_n \Delta p_n) \quad (6)$$

$$N = \{-1, 0, 1\}^2, \Delta p_n \in (-1, 1) \quad (7)$$

The fractional $\Delta p_n$ are the offsets to the integral $p_0 + p_n$ and allow the network to learn arbitrary local non-linear deformations. The locality of such deformations is determined by the depth at which they operate, i.e., if the deformations are on a layer closer to the image, they are relatively more localized.

The convolution operation at the layer where attention and deformable convolutions are set up is given by the following:

$$z_\ell(p_0) = \Sigma_{p_n \in n} \Sigma_q w(p_n) \cdot G(p_0 + p_n + \Delta p_n, q) \cdot \alpha(q) \cdot x_\ell(q), \quad (8)$$

where we are denoting the input to the layer as $x_\ell = f_\ell(x)$.

For computing the attention map, we set up a small convolutional network, with single convolution layer followed by a softmax layer, which operates on the input feature map and outputs an attention map as follows:

$$\alpha = \text{softmax}(W_a * x_\ell + b_a), \quad (9)$$

with the weights $W_a$ and bias $b_a$ being parameters learned jointly with the other. Here the symbol * denotes standard convolution operation.

A description will now be given regarding learning, in accordance with one or more embodiments of the present invention.

The loss function is a combination of the standard cross entropy based classification loss, $L_{cls}$ on the source examples and an adversarial loss, $L_{adv}$, on both the and target examples. The loss function can be represented as follows:

$$\mathcal{L}_{cls} = -\mathbb{E}_{(x_s, y_s) \sim (X_s, Y_s)} \Sigma_{k=1}^k y_s^k \log C(M_s(x_s)), \quad (10)$$

$$\mathcal{L}_{adv} = -\mathbb{E}_{x_s \sim X_s} \log D(M_s(x_s)) \quad (11)$$

$$-\mathbb{E}_{x_t \sim X_t}(1 - \log D(M_t(x_t))), \quad (12)$$

where $y_s^k = 1$ if $x_s$ belongs to class k, otherwise 0 (i.e., $y_s$ is the one hot encoding of the class annotation).

The objective of training is to optimize the parameters of the classifier C and those of the mappings $M_s$, $M_t$ to minimize $L_{cls} - \gamma \mathcal{L}_{adv}$, where $\gamma$ is a hyperparameter to set the tradeoff between the two losses, and to optimize the parameters of the discriminator to minimize $L_{adv}$, i.e., while keeping the source classification loss as low as possible, the mappings try to align the two domains at a distribution level by making them indistinguishable by the discriminator while the discriminator tries to tell them apart as best as possible. In an embodiment, we learn all the parameters using end-to-end backpropagation using the gradient reversal layer, and use batches with half of the examples from source domain and half from the target domain, in each step.

The present invention may be a system, a method, and/or a computer program product at any possible technical detail level of integration. The computer program product may include a computer readable storage medium (or media) having computer readable program instructions thereon for causing a processor to carry out aspects of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for domain adaptation between a source domain and a target domain, comprising:
    applying, by a hardware processor, an attention network to features extracted from images included in the source and target domains to provide attended features relating to a given task to be domain adapted between the source and target domains;
    applying, by the hardware processor, a deformation network to at least some of the attended features to align the attended features between the source and target domains using warping to provide attended and warped features;
    training, by the hardware processor, a target domain classifier using the images from the source domain; and
    classifying, by the hardware processor using the trained target domain classifier, at least one image from the target domain.

2. The computer-implemented method of claim 1, further comprising inputting the images included in the source and target domains into a set of common layers of a Convolutional Neural Network (CNN).

3. The computer-implemented method of claim 2, further comprising extracting, by the hardware processor using the common layers of the CNN, the features from the images included in the source and target domains.

4. The computer-implemented method of claim 3, wherein the CNN used by the hardware processor for said extracting step is an image-based CNN.

5. The computer-implemented method of claim 1, wherein the attention network highlights attention regions in the images included in the source and target domains using relative weights, wherein the attention regions in the images are assigned higher weights than non-attention regions.

6. The computer-implemented method of claim 1, wherein the deformation network comprises a Convolutional Neural Network (CNN) having at least one deformable convolutional layer.

7. The computer-implemented method of claim 1, further comprising aligning, by the hardware processor, the attended and warped features using a learning scheme that maximizes a feature discriminator loss while minimizing a domain adversarial loss.

8. The computer-implemented method of claim 1, wherein the neural network used in said classifying step uses different losses dependent upon a matching status between source and target labels for a current classification task.

9. The computer-implemented method of claim 8, wherein the neural network used in said classifying step generates a classification using a classification loss when the source and target labels for the current classification task are identical.

10. The computer-implemented method of claim 8, wherein the neural network used in said classifying step generates a classification using a verification loss when the source and target labels for the current classification task are different.

11. The computer-implemented method of claim 1, further comprising applying a global averaging pooling operation to the attended and warped features.

12. A computer program product for domain adaptation between a source domain and a target domain, the computer program product comprising a non-transitory computer readable storage medium having program instructions embodied therewith, the program instructions executable by a computer to cause the computer to perform a method comprising:
    applying, by a hardware processor, an attention network to features extracted from images included in the source and target domains to provide attended features relating to a given task to be domain adapted between the source and target domains;
    applying, by the hardware processor, a deformation network to at least some of the attended features to align the attended features between the source and target domains using warping to provide attended and warped features;
    training, by the hardware processor, a target domain classifier using the images from the source domain; and
    classifying, by the hardware processor using the trained target domain classifier, at least one image from the target domain.

13. The computer program product of claim 12, wherein the method further comprises:
inputting the images included in the source and target domains into a set of common layers of a Convolutional Neural Network (CNN); and
extracting, by the hardware processor using the common layers of the CNN, the features from the images included in the source and target domains.

14. The computer program product of claim 12, wherein the attention network highlights attention regions in the images included in the source and target domains using relative weights, wherein the attention regions in the images are assigned higher weights than non-attention regions.

15. The computer program product of claim 12, wherein the deformation network comprises a Convolutional Neural Network (CNN) having at least one deformable convolutional layer.

16. The computer program product of claim 12, wherein the method further comprises aligning, by the hardware processor, the attended and warped features using a learning scheme that maximizes a feature discriminator loss while minimizing a domain adversarial loss.

17. The computer program product of claim 12, wherein the neural network used in said classifying step uses different losses dependent upon a matching status between source and target labels for a current classification task.

18. The computer program product of claim 17, wherein the neural network used in said classifying step generates a classification using a classification loss when the source and target labels for the current classification task are identical.

19. The computer program product of claim 17, wherein the neural network used in said classifying step generates a classification using a verification loss when the source and target labels for the current classification task are different.

20. A computer processing system for domain adaptation between a source domain and a target domain, comprising:
a memory device including program code stored thereon:
a hardware processor, operatively coupled to the memory device, and configured to run the program code stored on the memory device to
apply an attention network to features extracted from images included in the source and target domains to provide attended features relating to a given task to be domain adapted between the source and target domains;
apply a deformation network to at least some of the attended features to align the attended features between the source and target domains using warping to provide attended and warped features;
train a target domain classifier using the images from the source domain; and
classify, using the trained target domain classifier, at least one image from the target domain.

* * * * *